United States Patent [19]

Helbrecht

[11] Patent Number: 4,557,076
[45] Date of Patent: Dec. 10, 1985

[54] GRINDING MACHINE FOR THE RIMS OF SPECTACLE LENSES

[76] Inventor: Otto Helbrecht, In den Weiden 3, D-4010 Hilden, Fed. Rep. of Germany

[21] Appl. No.: 606,955

[22] Filed: May 4, 1984

[30] Foreign Application Priority Data

May 6, 1983 [DE] Fed. Rep. of Germany ....... 3316619

[51] Int. Cl.[4] .............................................. B24B 49/00
[52] U.S. Cl. ............................ 51/165.71; 51/101 LG; 51/284 E
[58] Field of Search ...... 51/165.71, 105 EC, 105 LG, 51/101 LG, 284 E

[56] References Cited

U.S. PATENT DOCUMENTS

| 3,011,291 | 12/1961 | Walton | 51/101 LG |
|---|---|---|---|
| 3,899,851 | 8/1975 | Asselin | 51/101 LG |
| 4,027,245 | 5/1977 | Bourrat | 51/165.71 |
| 4,179,851 | 12/1979 | Neisler | 51/101 LG |
| 4,203,259 | 5/1980 | Haddock | 51/165.71 |
| 4,214,309 | 7/1980 | Korde | 51/165.71 |
| 4,217,736 | 8/1980 | Akaba | 51/284 E |

FOREIGN PATENT DOCUMENTS

| 1207235 | 6/1966 | Fed. Rep. of Germany . |
|---|---|---|
| 1652019 | 8/1971 | Fed. Rep. of Germany . |
| 7206781 | 7/1972 | Fed. Rep. of Germany . |
| 2004662 | 7/1972 | Fed. Rep. of Germany . |
| 2452262 | 5/1975 | Fed. Rep. of Germany . |
| 2457285 | 12/1977 | Fed. Rep. of Germany . |
| 2600497 | 3/1980 | Fed. Rep. of Germany . |
| 3120632 | 5/1981 | Fed. Rep. of Germany . |
| 0092364 | 10/1983 | Fed. Rep. of Germany . |

Primary Examiner—Harold D. Whitehead
Attorney, Agent, or Firm—Schwartz, Jeffery, Schwaab, Mack, Blumenthal & Evans

[57] ABSTRACT

The machine grinds the rims of spectacle lenses in accordance with data from an electronic data memory containing the circumferential configuration of the spectacle lens. The grinding machine is controlled by a computer.

14 Claims, 7 Drawing Figures

GRINDING MACHINE FOR THE RIMS OF SPECTACLE LENSES

BACKGROUND OF THE INVENTION

The present invention relates to a grinding machine for grinding the rims of spectacle lenses so as to make the lenses conform to a desired shape.

Grinding machines of this type are known in different configurations. These machines usually comprise a lens holder formed of a divided shaft having a suction cup which can be applied to the optical axis of the spectacle lens blank. The suction cup may be attached to one end of the divided shaft, while the other end of the shaft presses against the spectacle lens blank from the other side. In this way, the blank is held in a relatively secure manner such that its optical axis coincides with the axis of the divided shaft. The spectacle lens blank is defined herein as a spectacle glass lens that is still circular, i.e. has not been made conform to the shape of the opening in a spectacle frame.

The lens holder is supported on a slide or a rocker and may be guided by appropriate movement of the slide or rocker so that the rim of the lens blank rests against a rotating grinding disk. A template corresponding to the opening in the spectacle frame is located on the divided shaft forming the lens holder. When the spectacle lens blank has been ground to the specified dimensions, at a certain angular position, the template abuts against a stop. By means of a slow rotation of the lens holder, the periphery of the spectacle lens blank is ground to the shape desired, which is identical with the template.

Examples of grinding machines of this type are described in German Offenlegungsschrift No. 16 52 019, wherein the rocker is arranged in an approximately vertical position, and in German Gebrauchsmuster No. 72 06 781, wherein the rocker is approximately horizontal. A horizontal rocker is the most prevalent configuration and is advantageous among other reasons, mainly because a uniform grinding pressure is assured simply by the rocker being held on the grinding disk under its own weight. It is a common feature of the known embodiments of this type that they comprise a mechanical copying process wherein a template abutting against a stop must be present.

Attempts have already been made to eliminate the template by scanning the spectacle frame directly (German Pat. No. 12 07 235). This, however, is still mechanical copying.

Electronic circuits have been used in machines of the aforementioned special type only for auxiliary purposes, for example to control the grinding pressure (German Auslegeschrift No. 24 57 285).

The first step away from pure template control is described in German Offenlegungsschrift No. 31 20 632. Here the circumferential configuration of the spectacle lens is presented in a drawing or photographic image and scanned by photoelectronic means to guide the grinding spindle or disk, respectively. In this embodiment, again, the circumferential shape is present in a material form and must be inserted or set up correctly prior to grinding in order to be scanned. A substantial stock of templates or other carriers bodily reproducing the curve must be provided and errors are possible in their handling.

SUMMARY OF THE INVENTION

It is an object of the present invention to provide a grinding machine for spectacle lenses in which no reference to bodily reproduced circumferential curves of the spectacle lens shape is required.

Another object of the present invention is to provide a grinding machine for spectacle lenses which is relatively easy to operate and which is highly accurate in use.

According to the present invention, the circumferential configuration of the lens is thus no longer present in a bodily form, but as a plurality of data in the form of, for example, a number of pairs of values representing two-dimensional coordinates. The set of values corresponding to a given spectacle lens may be called up as needed and fed into the computer which then actuates the control device accordingly. The advantages obtained in relation to access speed and thus preparation of the grinding process on the one hand and the transmission of data for new shapes of spectacle frames are considerable.

The term "data memory" is intended to signify memories of different forms.

According to other aspects of the invention, the grinding machine may be correlated with a memory containing the data for a plurality of configurations of spectacle lenses. The individual types of spectacle frames on the market are provided with codes, whereby the different memory addresses may be selected and called up, so that the data for a given circumferential configuration are available immediately.

It is further possible to coordinate the grinding machine not with a memory of this type, but merely or additionally with a device for scanning data carriers each of which contains the data of a circumferential configuration.

In the latter case, a data carrier, for example a magnetic card or the like, is provided for a given individual spectacle frame. The data carrier is inserted in the grinding machine, thereby actuating the grinding of a spectacle lens blank into the corresponding circumferential configuration.

The purely electronic effectuation of the control of the grinding process throughout the industry is still a remote objective at this point in time. Thus, in order to render the grinding process adaptable, i.e. to be able to use the templates available to opticians at the present time, and to make the direct scanning of spectacle frames possible, a device for scanning a template on a lens opening of a spectacle frame may be used to produce the data for the control device. In this manner the data required for the control device may be obtained from curves that are bodily present and fed into the machines.

The provision of a working memory in addition to a nonvolatile permanent memory has particular advantages in cooperation with the scanning device. Sets of data of older spectacle frames, i.e. from individual pieces, may be acquired and used after checking for the production of a single spectacle lens or a pair of lenses. Following the completion of single pieces, the set of data may be extinguished from the working memory. If, however, the set of data is one that may be needed again at a later time, it may be transferred after checking into the permanent memory from which it may be called when required. In contrast to the working memory, the permanent memory is to be "nonvolatile", i.e. the data stored in the permanent memory are preserved even, for example, in the case of a power failure. To the extent possible, the data stored in the permanent memory should be immune to destruction by external effects.

In accordance with other aspects of the present invention, the control of the grinding machine may be effected digitally and the data may be supplied in coordinate pairs, one of which represents a rotation angle of the lens blank, and the other of which represents a radius from the lens blank optical axis.

The drive of the lens holder may be effected in angles of rotation corresponding to the sets of data, or in smaller steps, wherein the computer automatically performs the interpolation of intermediate values.

In the case of known grinding devices with pivoting arms, a certain inaccuracy of the grinding process is unavoidable due to small displacements resulting from the pivoting circle generating a not entirely exact radial motion of the spectacle lens blank. According to the present invention, this phenomenon is prevented by the use of a straight line guide along which the lens blank may be displaced. By the mobility of the pivoting axis, the errors resulting from the different pivot angles of the pivoting arm carrying the lens holder may be compensated for.

In accordance with other aspects of the present invention, it is possible to combine the property of an accurate pivoting circle with the otherwise desirable characteristics of a lens holder supported on a horizontal pivoting arm, thereby generating the grinding pressure in a simple manner. According to the present invention, the grinding pressure may be produced in the simplest possible fashion merely by weight, while simultaneously the errors due to the pivoting are compensated for.

The pivoting arm may always be oriented in the same, preferably horizontal, pivoting position with respect to the spectacle lens blank at the end of each grinding operation. When a defined rotating position at a specified radius of the spectacle lens is attained, the pivoting arm reaches the horizontal position and abuts against a stop.

According to the present invention, the position of the spectacle lens blank may be adjusted in the direction of its axis. This is important because different grinding disks arranged adjacent to each other may be applied to the spectacle lens, for example, for pregrinding, fine grinding, etc. Also, with such a device the position of a facet, for example a "Kaiser" facet, may be determined with respect to the rim of the spectacle lens in the axial direction. This is especially important in the case of thick spectacle lenses wherein it may be determined in this manner whether they will protrude from the frame or whether their thickness will extend rearward from the rim of the frame.

The present invention may also include an image screen as an accessory. The image screen provides the optician with a means to rapidly and visually inspect the circumferential curve and ascertain its conincidence with the curve desired.

BRIEF DESCRIPTION OF THE DRAWINGS

The above and other objects of the present invention will become more readily apparent as the invention is more clearly understood from the detailed description to follow, reference being had to the accompanying drawings, in which like reference numerals represent like parts throughout, and in which.

DETAILED DESCRIPTION OF THE PREFERRED EMBODIMENTS

Figure 1:
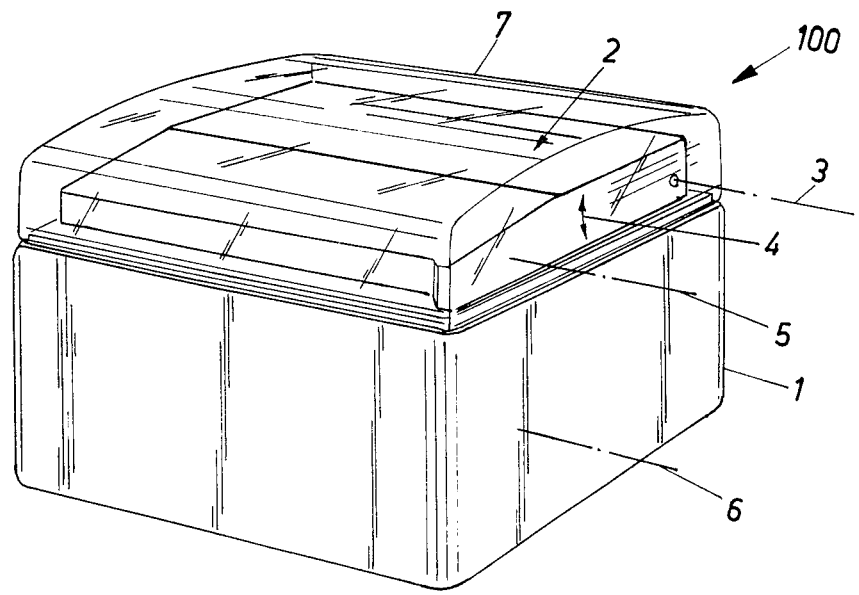
FIG. 1 shows a perspective overall view of the grinding machine.

The grinding machine is designated in FIG. 1 in its entirety by 100. Machine 100 comprises a box-like housing 1 and a pivoting arm 2. Pivoting arm 2 may be pivoted up and down in the direction of the arrow 4 and to the rear in FIG. 1 around a pivot axis 3 extending parallel to one edge of the housing 1. In its frontal area, pivot arm 2 carries a lens holder rotatable around an axle 5. Axle 5 is not visible in FIG. 1, as it is located under the wall of the pivoting arm 2. In the housing 1, the grinding disk assembly is provided vertically under the axle 5, with this disk assembly rotating around axle 6.

Figure 2:
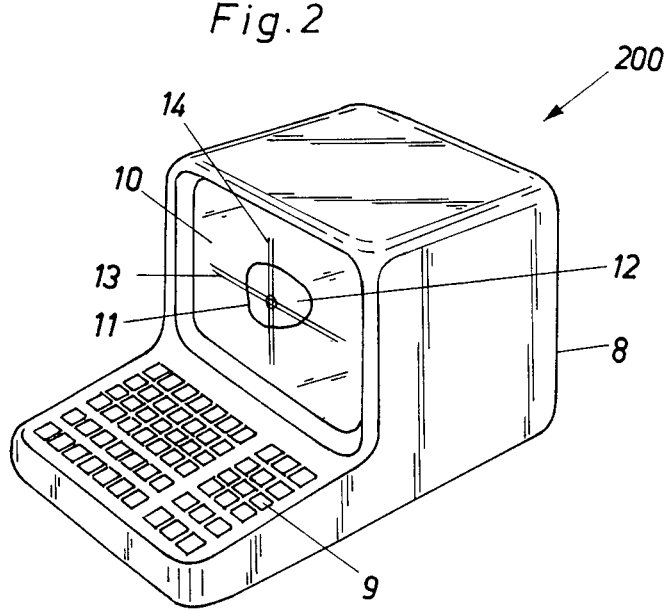
FIG. 2 shows a persepctive overall view of the associated image screen equipment.

The pivoting arm and thus the lens holder rest under the weight of the pivoting arm 2 on a grinding disk. The extent of the grinding into the spectacle lens is limited by a stop, which abuts against the pivoting arm whenever the specified dimension is attained. The stop is adjustable and the adjusting device is electronically controlled. The data for the electronic control, i.e. the radii associated with a certain angle of rotation of the spectacle lens blank, are stored in an electronic memory, located in the housing 8 of the control device designated in its entirety in FIG. 2 by 200. The control device 200 comprises a computer located in the housing 8 (not shown in detail). The computer may be actuated by means of the keyboard 9. An image screen 10 is present upon which the circumferential configuration of a spectacle lens 12 may be visualized. This configuration is be represented by a certain amount of data contained in the data memory and may be called up as needed by actuating the keyboard 9. The horizontal lines 13 and vertical lines 14 reproduced on the screen 10 are double lines representing the so-called decentering, i.e. the deviation of the center of the spectacle lens 12 from the position of the center of the eye of the wearer, which varies with the individual.

In the data memory of the control device 200, numerous, for example 100, sets of data or amounts of data may be stored, each of which corresponds to a certain spectable frame. When such a spectacle frame is to be equipped with lenses, the corresponding set of data is called up by feeding in the associated address code and and is passed to the computer which produces control pulses to limit the pivoting motion of the pivoting arm 2 in the direction of the arrow 4.

Figure 3:
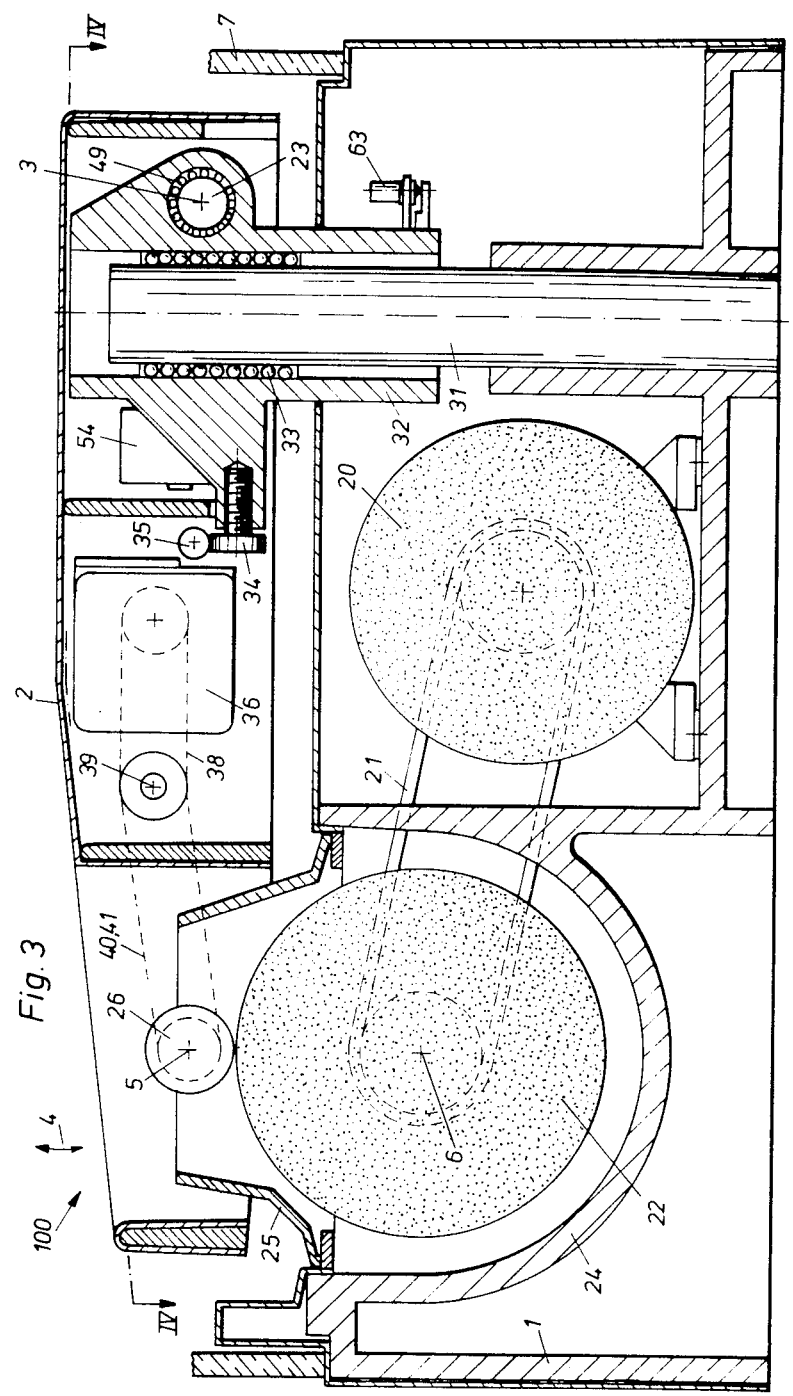
FIG. 3 shows a longitudinal section through the grinding machine.

As seen in FIG. 3, a drive motor 20 is arranged in the housing 1, which drives by means of a belt 21 the grinding disk assembly 22 bearingly supported on the axle 6 or a corresponding spindle shaft, respectively. The grinding disk assembly 22 consists of several grinding disks or grinding disk areas arranged adjacent to each other. The grinding disks or grinding disk areas effect, respectively, the operations of pregrinding, postgrinding and the grinding of different facets. The spectacle lens blank rotating on the holder on axle 5 may be applied to different grinding disks or disk areas by displacing the entire pivoting arm 2 by sliding on the shaft 23 along the pivoting axis 3, perpendicularly to the plane of the drawing.

The grinding disk assembly 22 is arranged in a tub like recess 24 of the wall of the housing 1, in which the grinding water is collected. Above the tub like recess 24, a collar 25 open to the top is provided as a protection against the water spray. The spectacle lens blank (not shown) held on the shaft 26 of the lens holder 30, enters the collar 25 from above.

In the rear area, i.e. the area to the right in FIG. 3, a vertical column 31 is arranged approximately in the center of the housing 1. Column 31 forms a straight line guide, on which a guide body 32 is supported by means of a ball bearing cage 33. The guide body 32 carries the shaft 23, around the axis 3 of which the pivoting arm 2 may be pivoted up and down in the direction of the arrows 4.

On the side of the shaft 23 opposite the column 31, the guide body 32 carries a stop 34. The shaft 35 is fixedly located in the pivoting arm 2 and abuts stop 34 when the pivoting arm 2 is pivoted down into the essentially horizontal position shown in FIG. 3.

Figure 4:
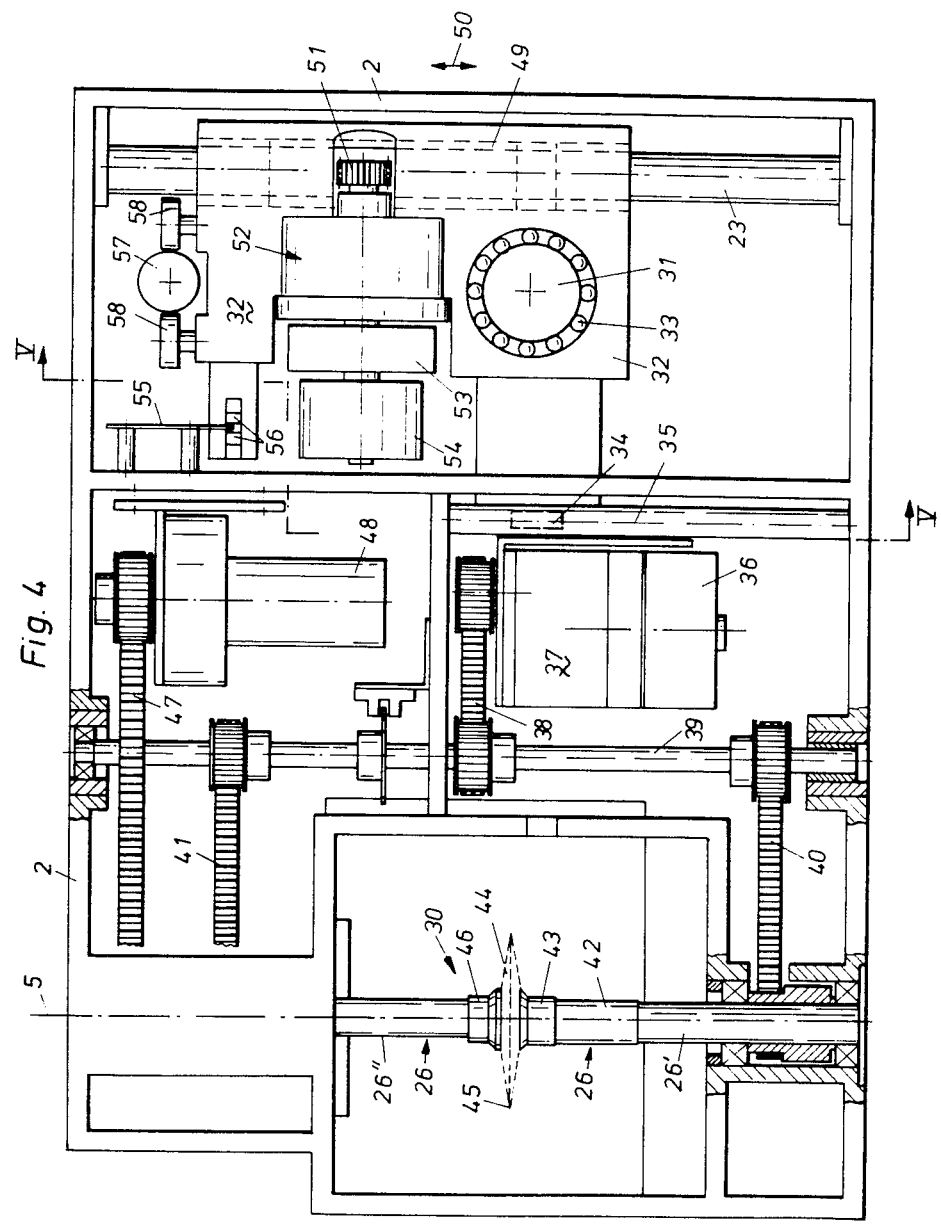
FIG. 4 shows a view on the line IV—IV in FIG. 3.

In the pivoting arm 2, as seen with particular clarity in the FIG. 4, a step motor 36 is located. Step motor 36 acts through a reducing gear unit 37 and a toothed belt 38 on a shaft 39 extending parallel to the shaft 26 of the lens holder 30 and throughout the width of the housing 1. The shaft 26 of the lens holder 30 is divided. The part 26′, which is shown in the lower part of FIG. 4, is driven by the shaft 39 through the toothed belt 40, and the upper part 26″ is driven by a toothed belt 41. The two halves 26′, or 26″ of the lens holder shaft are thus driven synchronously. The half 26′ of the shaft 26 carries a terminal piece 42 which is compressible in the manner of a telescope against spring action. A rubber suction cup 43 may be placed on terminal piece 42. The rubber suction cup 43 is the carrier for the spectacle lens blank 44 (indicated by a broken line), the rim 45 of which is to be ground into a configuration corresponding to a certain spectacle lens frame. The rubber suction cup 43 is applied to the spectacle lens blank 44 at the optical axis of the latter, by means of a separate auxiliary device. The spectacle lens blank 44 is pressed by spring action against the abutment 46 on the other half 26″ of the shaft 26.

The rotating position of the shaft 26 is transmitted by means of a toothed belt 47 to a resolver 48, which determines the actual instantaneous position of shaft 26 and transmits it to the control means.

As seen in FIG. 4, the pivoting arm 2 may be displaced on the shaft 23 with respect to the guide body 32 in the direction of the arrows 50 by means of a ball bushing 49. The displacement may take place in a controlled manner by means of a pinion acting on the shaft 23 with the pinion being driven by a step motor 54 through a magnetic clutch 52 and a reducing gear 53. The magnetic clutch 52 is provided, so that the pivoting arm 2 may be displaced manually in the lateral direction, if required.

The finding of the zero point that is necessary for control, is effected by means of a flag 55, fixedly arranged in the housing of the pivoting arm 2 and entering the beam of a photoelectric device 56. The zero point is located when the beam is continuous or interrupted, depending on the layout of the control. The guide body 32 is guided along the column 31 in the vertical direction only. To prevent rotation of the guide body around the column 31, a second column 57 is provided in the housing 1 of the grinding machine. Guide rollers 58 are mounted on the guide body 32 and roll along column 57, thereby preventing its rotation.

Figure 5:
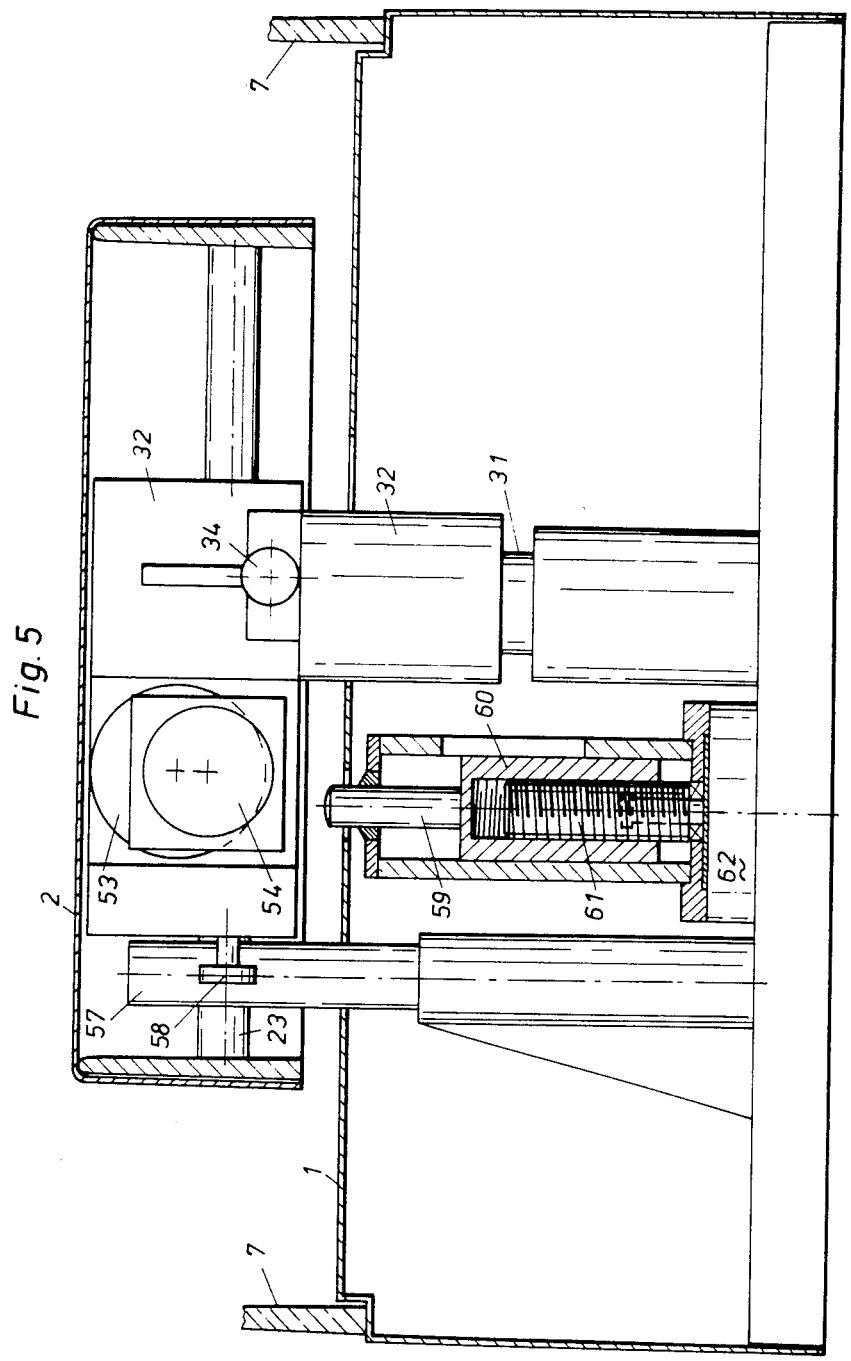
FIG. 5 shows a view on the line V—V of FIG. 4.

FIG. 5 shows the control of the height position of the guide body 32. The guide body 32 is free to move in the vertical direction on the column 31 by means of the bushing 33 and would slide down the column 31 without preventive measures. The body is supported by a peg 59 located on a bushing 60 forming a spindle nut and is able to press against the guide body 32 from below. The peg 59 is moved up and down by a spindle 61 rotated by a step motor 62 in the housing 1. The zero point of the height control is determined by a highly accurate limit switch 63 (FIG. 3).

After the spectacle lens blank 44 has been clamped and the control program corresponding to the circumferential configuration desired, selected, initially the guide body 32 is moved to a predetermined height from a zero point determined by the limit switch 63. The spectacle lens blank 44 is then set on the grinding disk assembly 22. The grinding disk forms a circular grind in the lens blank 44 starting from the circumference. The grinding continues until the pivoting arm 42 reaches its horizontal position, i.e. the shaft 35 abuts against the stop 34. The deepest point of the grind is now located at a predetermined radial distance from the axis 5 of the lens holder 30, which is also the optical axis of the lens blank 44.

The lens holder 30 is now rotated further by means of the step motor 36 by a certain angular distance. This angular distance corresponds to the division upon which the control is based. For example, the entire circumferential angle of 360° may be divided into sixty steps of 6° each. In this case, therefore, the lens holder would be rotated by 6°. This new angular position corresponds to a new radius taken from the data memory. The position in height of the guide body 32 is altered in keeping with the new radius. Grinding is then continued until the pivoting arm 2 again abuts against the stop 34. Subsequently, a new rotation of the lens holder 30 by a division angle is effected, together with the corresponding change in the position in height of the guide body 32. In this manner, the glass holder 30 with the spectacle lens blank 44 is ground over its entire circumference.

The data for the adjustment of the position in height of the guide position 32 corresponding to the angular position attained is taken from the data memory and processed by means of the computer for the control of the spindle 61.

The data may be provided in the form of a set or amount of data by the manufacturer for a given spectacle frame. It is, however, possible also to obtain the data for the operation of the control device 200 by means of the scanning device designated in its entirety by 300 in FIG. 6 from a conventional template 70 or directly from a spectacle frame 80. The scanning device 300 comprises a housing 71 in the form of a box open at the top, in which a slide 74 is supported in a longitudinally displaceable manner on longitundinally continuous shaft 72 by means of a ball bearing bushing 73. Slide 74 is further supported on the side to the right in FIG. 7 by means of a roll 75 on a shaft 76 parallel to the shaft 72 and fixedly mounted in the housing.

A step motor 77 is mounted on the slide 74. Step motor 77 acts on shaft 79 of a template carrier 81 through a reducing gear 78. The step motor 77 rotates the template 70 in predetermined angular steps, for example from 6° to 6°. On the shaft 79 a diaphragm or flag 82 is mounted, which cooperates with a photoeletric device 82 for the determination of the zero point.

Figure 6:
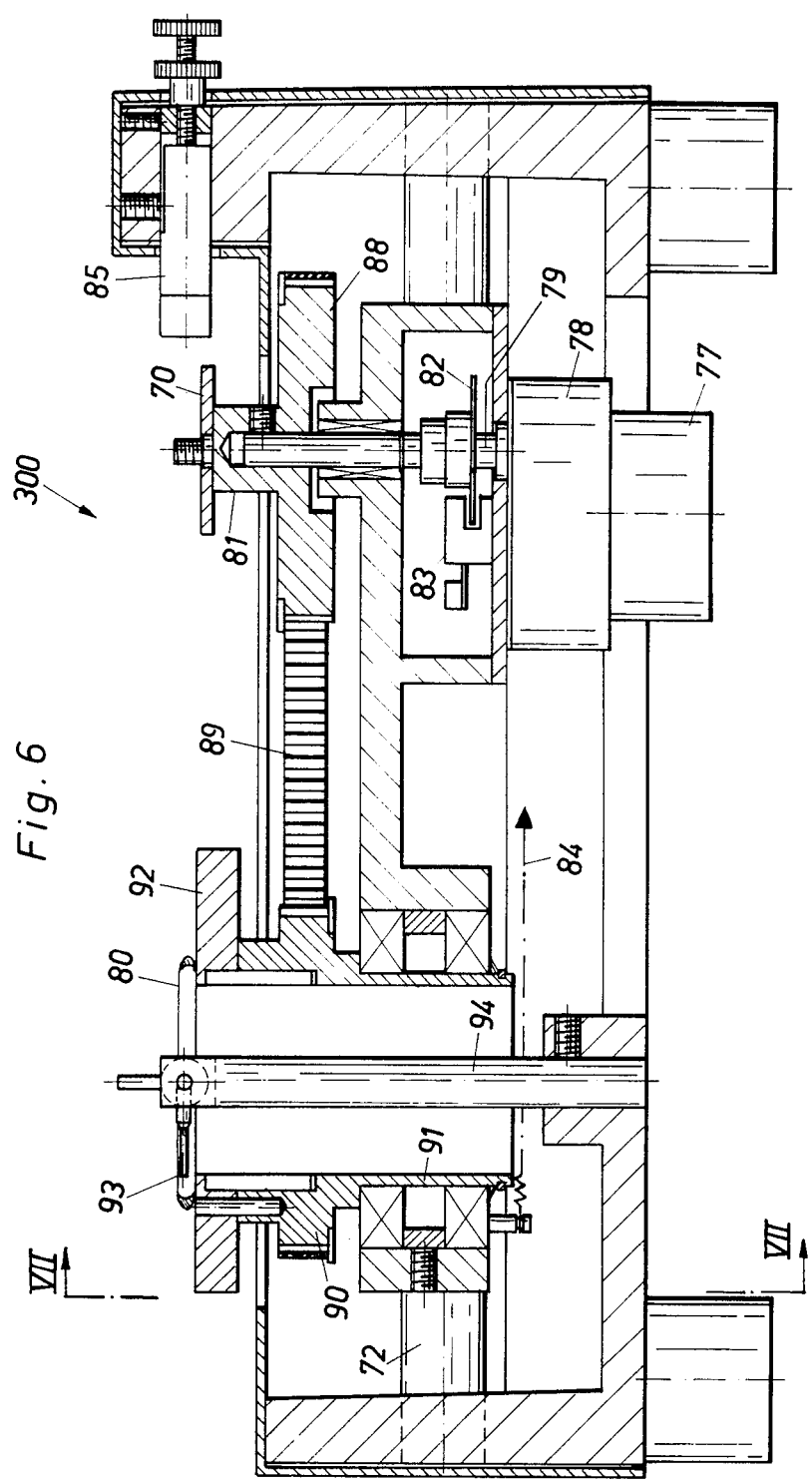
FIG. 6 shows a longitudinal section through the scanning device for templates and spectacle frames, respectively.
Figure 7:
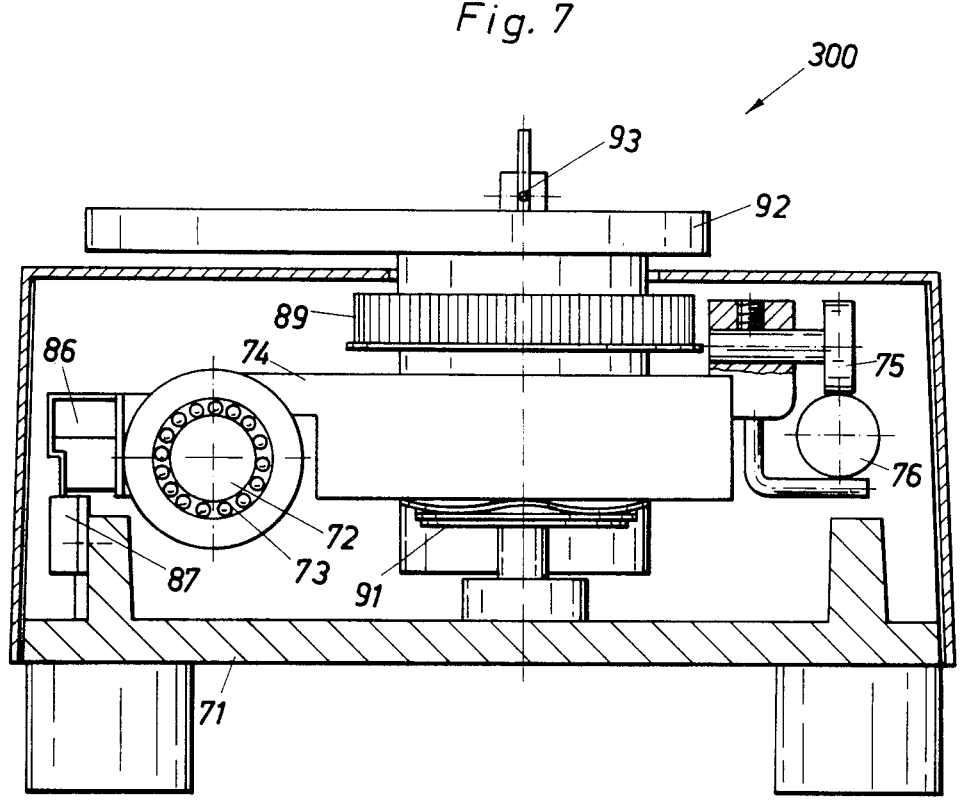
FIG. 7 shows a view on the line VII—VII in FIG. 6.

The slide 74 is drawn by a thrust spring 84 toward the right in FIG. 6, until the template 70 abuts against an adjustable stop 85, fixedly arranged in the housing 71. If the template 70 is rotated by the step motor 77 by a predetermined angular step, the radius with respect to the axis of the shaft 79 is generally altered and the template 70 and thus the entire axis of the slide 74 are pressured away from the stop 85. The displacement along the shaft 72 is measured in a digital form by a path transducer 86 cooperating with a suitable length scale 87 fixedly mounted in the housing. A digitalized radius is assigned in this manner to each angle of rotation and these pairs of values may be entered into a memory. They represent in their entirety the outline of the template 70 and may be used for the guidance of the grinding machine 100.

A tooth gear 88 is joined in a single piece with the carrier 81 of the template 70. Gear 88 acting by means of a toothed belt 89 on a tooth gear 90 located in a bushing 91 rotatingly mounted on the slide 74 and bearing on its upper part a plate 92 to which the spectacle frame 80 may be clamped by a plurality of clamps, (not shown). A journal 94 fixedly mounted in the housing 71 extends vertically upward through the inside of the bushing 91, carrying at its upper end at the height of the spectacle frame 80 a horizontal scanning pin 93 performing a function identical with that of the stop 85. The tension spring is drawing the slide 74 toward the right in the direction of the arrow 84, until the scanning pin 93 is in contact with the inner circumference of the opening of the spectacle frame 80. The step motor 77 rotates the plate 92 with the spectacle frame 80, wherein a certain radius, determined by the prevailing position of the slide 74, is associated with each angular step. As the internal diameter of the bushing 91 is substantially larger than the diameter of the journal 94, the slide 74 is able to effect the displacements occurring in actual practice.

The foregoing description is set forth for the purpose of illustrating the present invention, but is not intended to be limitative thereof. Clearly, numerous additions, substitutions, and other changes can be made without departing from the scope of the invention as set forth in the appended claims.

What is claimed:

1. A grinding machine for the rims of spectacle lenses, comprising:
   a holder for a spectacle lens blank;
   a grinding disk assembly;
   a means for applying said lens blank to said grinding disk assembly and rotating said lens blank about a first axis parallel to an optical axis of said lens blank, wherein said means for applying and rotating include a pivoting arm for holding the lens holder and for pivoting about a second axis parallel to the first axis, a guide body connected to the pivoting arm, a straight line guide for slidably guiding the guide body along a third axis perpendicular to the first axis, a first variable stop for stopping the guide body on the straight line guide, a second stop for stopping the pivoting of the pivot arm when the arm is substantially horizontal; and
   means for controlling said application of said lens blank to said grinding disk assembly according to a predetermined circumferential configuration of the spectacle lens, said control means comprising an electornic computer, fed by an electronic data memory, containing a set of data indicative of the desired circumferential configuration of said spectacle lens and wherein the controlling means also includes means for varying the position of said first stop, and wherein said second stop is operatively connected with the controlling means for stopping said arm in a substantially horizontal position.

2. A grinding machine according to claim 1, including an electronic memory containing the data for a plurality of circumferential configurations of spectacle lenses.

3. A grinding machine according to claim 1, including means for scanning data carriers, each said data carrier containing the data for one circumferential configuration.

4. A grinding machine according to claim 1, including means for scanning an element having a shape indicative of the desired shape of said spectacle lens to produce said set of data for controlling said application of said lens blank to said grinding disk assembly.

5. A grinding machine according to claim 1, including a working memory and a nonvolatile permanent memory.

6. A grinding machine according to claim 1, wherein the control means operates in a digital manner and wherein said set of data is in the form of pairs of values, of which one represents a rotating angle around the optical axis of the spectacle lens and the other the associated radius of the spectacle lens.

7. A grinding machine according to claim 1, wherein said means for applying and rotating said lens blank comprises a step motor connected to said lens holder for rotating said lens holder in angular steps or integer subdivisions of said angular steps corresponding to increments of the angle of rotation.

8. A grinding machine according to claim 4, wherein said scanning means comprises means for holding said element, a mobile slide mounting said holding means, a step motor connected to said mobile slide for rotating said slide in predetermined angular steps, a stationary scanning stop, supported on a circumference of said element such that the slide is displaced by variations of a surface of said element taking place as a result of the different angles of rotation, and means for the digital measurement of the displacement of the slide.

9. A grinding machine according to claim 1, wherein said applying and rotating means comprises means for displacing said lens holder parallel to said second axis.

10. A grinding machine according to claim 1, wherein said control device comprises a video screen, on which the desired circumferential configuration of the spectacle lens may be displayed.

11. A grinding machine according to claim 4, wherein said element indicative of the desired shape of said spectacle lens comprises a lens opening of a spectacle frame.

12. A grinding machine according to claim 4, wherein said element indicative of the desired shape of said spectacle lens comprises a template.

13. A grinding machine according to claim 1, wherein said first stop comprises a peg for abutting against and supporting said guide body from below, a spindle connected with the peg, for moving the peg up and down, and a step motor, controlled by said means for controlling, for actuating the spindle.

14. A grinding machine according to claim 13, further comprising highly accurate limit switch means for determining a zero point for said first stop.

* * * * *